Dec. 19, 1950     J. R. HOWE     2,534,266
POWER GRAIN SCOOP UNLOADER FOR VEHICLES

Filed Jan. 14, 1946     2 Sheets-Sheet 1

INVENTOR.
John R. Howe.
BY
*H. A. McGrew*
ATTORNEY.

Dec. 19, 1950 J. R. HOWE 2,534,266
POWER GRAIN SCOOP UNLOADER FOR VEHICLES
Filed Jan. 14, 1946 2 Sheets-Sheet 2
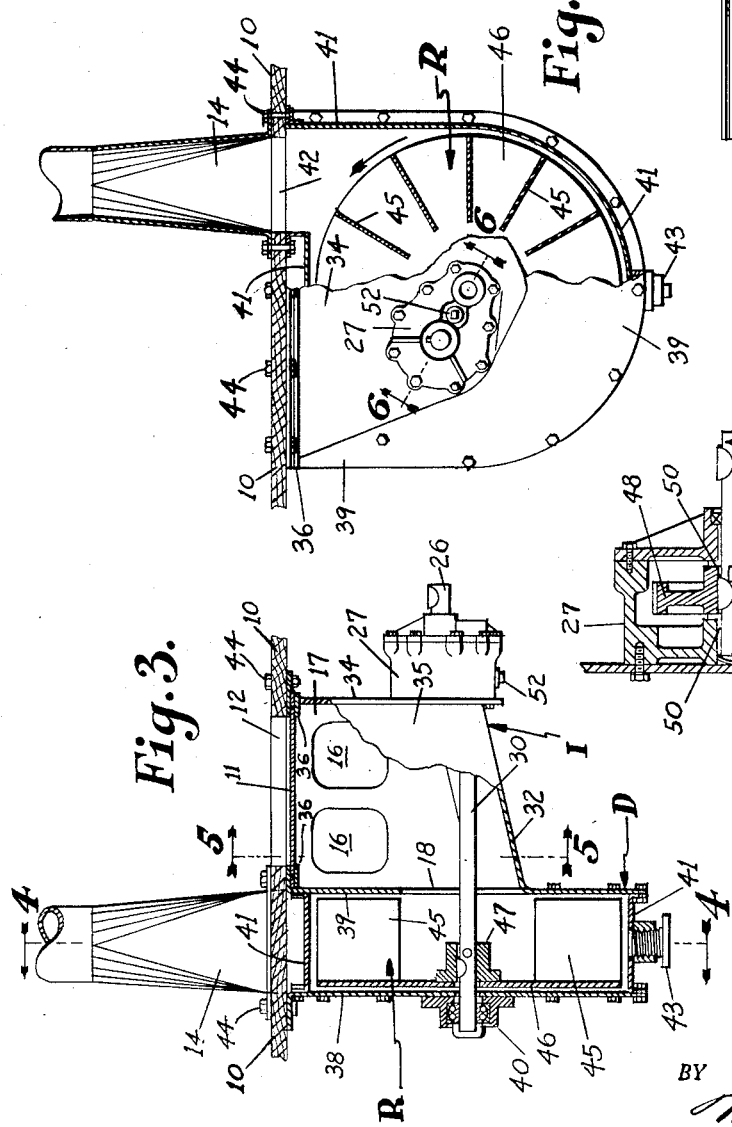
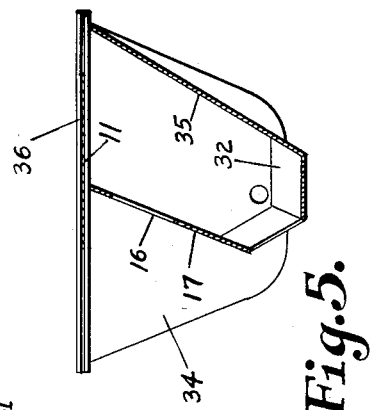
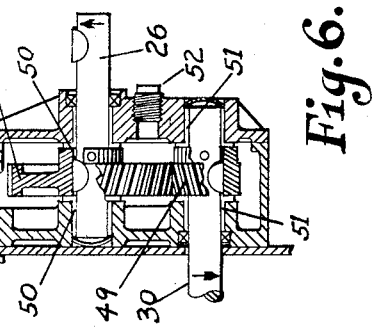
INVENTOR.
John R. Howe
BY
*W. A. McGrew*
ATTORNEY.

Patented Dec. 19, 1950

2,534,266

UNITED STATES PATENT OFFICE 2,534,266

POWER GRAIN SCOOP UNLOADER FOR VEHICLES

John R. Howe, Denver, Colo.

Application January 14, 1946, Serial No. 641,036

5 Claims. (Cl. 214—83.28)

This invention relates to unloading devices for handling grain or the like, and more particularly to a power scoop adapted to be installed on a grain truck, for unloading grain from the truck.

In the handling of grain such as wheat, scooping by hand is a tedious and tiresome, as well as a time-consuming operation. The grain may be loaded from a threshing machine into trucks or the like, for transportation to elevators, railway cars, or storage bins, but it is not always possible to unload the trucks as quickly and with ease. Grain such as wheat is difficult to pick up with a suction device, and power operated hoists for tipping trucks to unload the same are adaptable only as permanent installations, such as at elevators or the like. The alternative is unloading the truck by hand, which is usually highly unsatisfactory.

Among the objects of this invention are to provide an improved device for unloading grain or the like, as from a truck or other transporting vehicle; to provide such an unloading device which may be installed with facility on a truck body; to provide such an unloading device which may be operated from the truck engine but which will require power only during operation; to provide such a device which will operate effectively irrespective of the grain level in the truck body; to provide such a device which will not interfere with the use of the truck for purposes other than transporting grain; to provide such a device which produces a minimum of wear on the truck engine and associated parts; and to provide such a device which has a relatively large capacity.

The above and other objects of this invention will become apparent from the following description, taken in connection with the accompanying drawings, in which:

Fig. 3 is a side elevation of the device, partly broken away to show the interior construction;

Fig. 4 is a front elevation of the device, also partly broken away to show the interior construction;

Fig. 5 is a vertical section taken along line 5—5 of Fig. 3; and

Fig. 6 is a limited oblique section taken along line 6—6 of Fig. 4.

Figure 1:
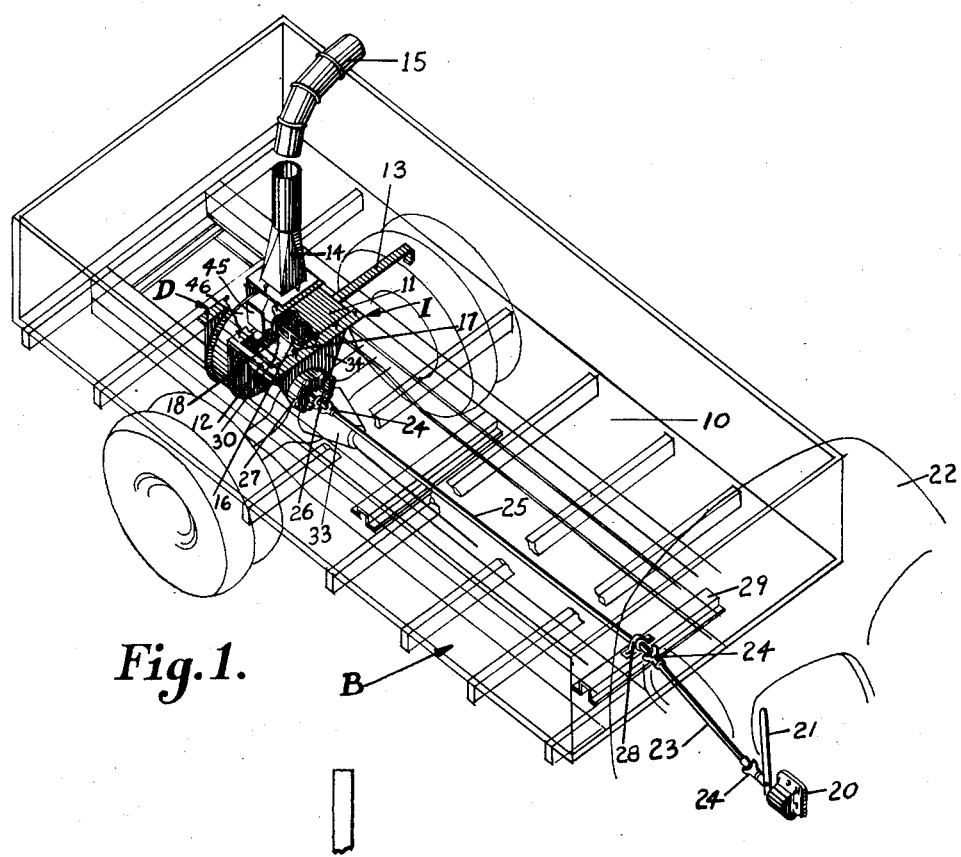
Fig. 1 is a phantom, diametric view illustrating an unloading device of this invention installed on a grain truck.
Figure 2:
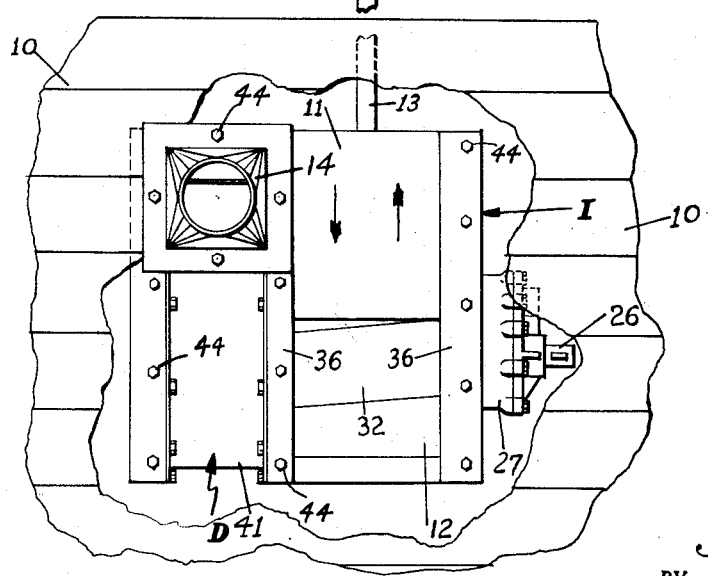
Fig. 2 is a top plan view of the device.

As in Fig. 1, the unloading device of this invention may be installed beneath a floor 10 of a body B of a wheeled truck or similar grain transporting vehicle. The device preferably includes an intake section I and a discharge section D. A sliding gate 11 for an intake opening 12 may be moved by a handle 13 to permit grain in the body B to flow into the intake section I, and thence into the discharge section D. The latter contains a twelve bladed rotor R for producing an air stream or blast which moves the grain, such as wheat, through a standpipe 14, the latter having a discharge section 15 which may be adjusted to discharge in different directions. Also, pipe sections may be added to or taken away therefrom, to increase or decrease the height of discharge of the grain.

Gate 11 is preferably opened a varying amount in accordance with the height of grain immediately above the opening, the grain flowing to rotor R partly by gravity and partly by the suction effect of the rotor. If gate 11 were opened completely when the body B is full, there would be a tendency for the discharge section D to choke up and cease to function properly, due to insufficient air supply, but such tendency is overcome, in accordance with this invention, by air intake openings 16 in a side wall 17 of the intake section I. Intake openings 16 provide an adequate supply of air to the rotor R, irrespective of the amount of grain above intake opening 12, since air openings 16 are beneath the floor 10 of the truck body and also preferably above a feed opening 18 between the intake section I and the discharge section D. Air intake openings 16 are thus important features of this invention, since they insure effective operation, irrespective of grain level. As will be evident, the number and position of the air intake opening or openings may be varied considerably.

Power for operating the unloading device preferably is derived from the engine of the truck, as by a power take-off unit 20 adapted to be attached to the transmission gear box in a conventional manner and provided with a hand lever 21 extending into cab 22, so that the unloading device may be operated only when desired. A short shaft 23 is connected by universal joints 24 with the power take-off unit 20 at one end, and with a long shaft 25 at the opposite end. In turn, shaft 25 is connected at its opposite end by another universal joint 24 with a stub shaft 26 which extends from a gear box 27, attached to the front end of intake section I. The front end of shaft 25 is trunnioned in a pillow block 28 mounted on a crossbeam 29 of the truck body B, such as just to the rear of cab 22. Shafts 23 and 25 are preferably rotated at a relatively low speed, the rate of rotation being increased in gear box 27 so that rotor shaft 30 will be rotated at a relatively high speed. The step up in speed in gear box 27 permits the truck motor to be run at a relatively low speed, thus reducing wear on the engine, as well as on the transmission.

As in Figs. 2 to 5, inclusive, the intake section I is provided with a laterally and forwardly tipped bottom plate 32 to provide clearance for the differential housing 33, shown in Fig. 1, and also to provide a surer flow of grain to feed opening 18. The front wall 34 of intake section I, to which gear box 27 is attached, may be vertical, while outside wall 35 may slant inwardly, as in Fig. 5, to direct the grain into feed opening 18, but the side wall 17 preferably slants outwardly, to minimize any tendency for grain to spill through air openings 16. Slides 36 are formed at the upper end of intake section I, for movement of gate 11, which need be only slightly larger than the intake opening 12.

The discharge section D, as in Figs. 3 and 4, is formed by end plates 38 and 39, to the former of which is attached a bearing 40 for rotor shaft 30 and in the latter of which is formed feed opening 18. A circular plate 41 is attached to end plates 38 and 39, and extends, as in Fig. 4, from one side of a discharge opening 42 in floor 10, around rotor R and then back to the opposite side of discharge opening 42. A clean out plug 43 may be provided, to permit all of the grain in the discharge section to be removed, as when the unit is to be inactive for a period of time. As will be evident from Figs. 3 and 4, the unit is installed beneath the floor 10 of body B, only the heads of bolts 44, by which the unit is attached to the floor, and standpipe 14 being above floor level. Also, it is necessary only to make two relatively small holes in the floor—one to serve as intake opening 12 and the other to serve as discharge opening 42. Thus, installation is quite simple and easy.

Rotor R may be constructed in a suitable manner, such as including twelve radial blades 45 attached to a back plate 46, in turn attached to a central sleeve 47 which is keyed or pinned, or both, to shaft 30. Preferably, blades 45 are rectangular in shape as shown, and also provide a clearance space at the center for entrance of grain and air. Air flowing through air openings 16 carries grain with it into rotor R, and is discharged by centrifugal force through standpipe 14. The grain is carried on and by a cushion of air, as it were, since very few grain kernels receive any appreciable impact from the blades, and the grain is carried to substantial heights by the velocity of the air stream discharged through the standpipe. While the number of blades may be changed for different conditions, experiments with different numbers of blades showed that, for a rotor diameter of 18 in., and a rotor speed of 600 to 1000 R. P. M., the highest efficiency and effectiveness in operation was obtained with twelve blades.

In gear box 27, as in Fig. 6, the desired increase in speed may be obtained by a gear 48 keyed to stub shaft 25 and engaging a pinion 49 keyed to rotor shaft 30. Bushings 50 and 51 may be provided for shafts 25 and 30, respectively, and lubrication filling and drain plugs 52 may also be provided. Gear 48 and pinion 49 are preferably helical to provide adequate durability while at the same time insuring silent operation.

From the foregoing, it will be apparent that the unloading device of this invention fulfills to a marked degree the objects and requirements hereinbefore set forth. The air intake in the inclined walled section 17, the use of a helical gear and pinion, and a twelve bladed rotor, are features which, both alone and in combination, provide a device which operates efficiently and effectively. The unloading device also requires a minimum of change in the truck body since only two small holes are required, as indicated previously. Also, when the device is not in use, cover plates may be placed over the holes, the standpipe 14, of course, being removed and stored.

Although one embodiment of this invention has been described in detail, it will be understood that other embodiments may exist, and that various changes may be made both in the specific construction and in the arrangement and operation of parts, all without departing from the spirit and scope of this invention.

What is claimed is:

1. A device for unloading grain from a body mounted on a truck or the like, comprising a power take-off adapted to be connected to the truck transmission; an operating lever for optionally causing said power take-off to be operative; a scoop unit adapted to be installed above the differential housing of said truck and including an intake section and a discharge section; a drive shaft from said power take-off to said unit; a rotor installed in said discharge section and having twelve equally spaced and radially extending blades; a standpipe leading from said rotor discharge and adapted to receive a stream of air carrying grain through a hole provided for such purpose in the floor of said truck body; a gate for controlling the flow of grain through an intake hole in the floor of said truck body to said intake section, the bottom of said intake section being slanted to accommodate said differential housing and one wall of said intake section slanting inwardly; a feed opening leading from said intake section to said discharge section; a pair of air intake holes in said slanting wall and disposed in a plane substantially entirely above the level of said feed opening; a gear box attached to the front end of said intake section; and a helical gear and pinion in said gear box for rotating said rotor at an increased speed.

2. Apparatus for unloading granular material comprising a rotor shaft, a rotor mounted on said shaft, a discharge housing surrounding said blower, a tangential outlet on said housing, an axial inlet on one side of said housing, an intake section mounted on said discharge housing around said inlet, having a bottom wall extending upwardly and outwardly from said blower housing below said inlet, said intake section having substantially parallel side walls extending upwardly and laterally, a control gate across the upper ends of said side walls for controlling the flow of granular material, the upper one of said side walls having an air intake opening therein adjacent said control gate, and said intake section also having an outer wall connecting said side and bottom walls.

3. Apparatus for unloading granular material comprising a rotor shaft, a rotor mounted on said shaft, a discharge housing surrounding said blower, a tangential outlet on said housing, an axial inlet on one side of said housing, an intake section mounted on said discharge housing around said inlet, having a bottom wall extending upwardly and outwardly from said blower housing below said inlet, said intake section having substantially parallel side walls extending upwardly and laterally, a control gate across the upper ends of said side walls for controlling the flow of granular material, the upper one of said side walls having an air intake opening therein adjacent said control gate, and said intake section also having an outer wall connecting said side and bottom walls, a gear box mounted on said outer wall, said rotor shaft extending through said axial inlet and said outer wall into said gear.

4. Apparatus for unloading granular material comprising a rotor shaft, a rotor mounted on said shaft, a discharge housing surrounding said blower, a tangential outlet on said housing, an axial inlet on one side of said housing, an intake section mounted on said discharge housing around said inlet, having a V-shaped bottom wall extending upwardly and outwardly from said blower housing below said inlet, said intake section having substantially parallel side walls extending upwardly and laterally, a control gate across the upper ends of said side walls for controlling the flow of granular material, the upper one of said side walls having an air intake opening therein adjacent said control gate, and said intake section also having an outer wall connecting said side and bottom walls.

5. Apparatus for unloading granular material comprising a rotor shaft, a rotor mounted on said shaft, a discharge housing surrounding said blower, a tangential outlet on said housing, an axial inlet on one side of said housing, an intake section mounted on said discharge housing around said inlet, having a bottom wall extending upwardly and outwardly from said blower housing below said inlet, said intake section having substantially parallel side walls extending upwardly and laterally, a control gate across the upper ends of said side walls for controlling the flow of granular material, the upper one of said side walls having an air intake opening therein adjacent said control gate, said intake section also having an outer wall connecting said side and bottom walls, a gear box mounted on said outer wall, said rotor shaft extending through said axial inlet and said outer wall into said gear, a small diameter pinion gear mounted on said shaft within said gear housing, a large diameter driver gear meshing with said pinion gear, and said driver gear having a drive shaft extending outwardly through said gear housing.

JOHN R. HOWE.

REFERENCES CITED

The following references are of record in the file of this patent:

UNITED STATES PATENTS

| Number | Name | Date |
|---|---|---|
| 1,659,577 | Royle | Feb. 21, 1928 |
| 1,792,953 | Wilcoxen | Feb. 17, 1931 |
| 1,844,797 | Schlechter et al. | Feb. 9, 1932 |
| 2,052,169 | Darden | Aug. 25, 1936 |
| 2,340,983 | Pfeiffer et al. | Feb. 8, 1944 |
| 2,363,589 | Holland-Letz | Nov. 28, 1944 |
| 2,394,058 | Hitchcock et al. | Feb. 5, 1946 |
| 2,405,094 | Michael | July 30, 1946 |
| 2,409,270 | Glessner | Oct. 15, 1946 |